United States Patent [19]
Miller et al.

[11] 3,827,722
[45] Aug. 6, 1974

[54] SAFETY CHAIN ATTACHMENT FOR ROOF-MOUNTED TRAILER HITCH

[75] Inventors: Dennis D. Miller; Jerry W. Karr, both of Warrensburg, Mo.

[73] Assignee: Harmon Industries, Inc., Grain Valley, Mo.

[22] Filed: Jan. 8, 1973

[21] Appl. No.: 321,864

[52] U.S. Cl. .............................. 280/432, 280/457
[51] Int. Cl. ........................................... B62d 53/10
[58] Field of Search ........... 280/423, 432, 446, 456, 280/459, 460, 474, 457

[56] References Cited
UNITED STATES PATENTS

| | | | |
|---|---|---|---|
| 1,926,264 | 9/1933 | Connors | 280/422 |
| 2,625,406 | 1/1953 | Black | 280/432 |
| 2,668,720 | 2/1954 | Finch | 280/432 |
| 2,802,676 | 8/1957 | Gregory et al. | 280/432 |
| 3,181,887 | 5/1965 | Boylan et al. | 280/422 X |
| 3,383,119 | 5/1968 | Carroll | 280/423 R |
| 3,692,332 | 9/1972 | Pappatheodoru | 280/423 R |
| 3,724,875 | 4/1973 | Hillman | 280/457 |

Primary Examiner—Leo Friaglia
Assistant Examiner—Randall A. Schrecengost
Attorney, Agent, or Firm—D. A. N. Chase

[57] ABSTRACT

A hitch assembly which connects the tongue of a trailer and one or more safety cables or chains to a towing vehicle, wherein relative rotation of the vehicle and trailer about the hitch axis is permitted without interference. The assembly includes a safety coupling device for the safety chains, such device having a fixed hub coaxial with the hitch axis and a rotatable element supported on the hub for rotation thereon. The element includes a pair of opposed, radially outwardly extending, horizontal arms to which two safety chains are connected that extend from the trailer body. The hub is secured by fasteners directly to the supporting structure of the hitch assembly independently of the hitch ball or other hitch component, so that failure of the primary hitch does not affect the safety coupling. The arrangement is particularly advantageous in roof-mounted hitches where the vehicle and trailer are capable of unlimited relative rotation, in that the arms rotate with the trailer as the latter and the vehicle undergo relative rotation to prevent the safety chains from interfering with the free movement of either the vehicle or the trailer about the hitch axis.

4 Claims, 5 Drawing Figures

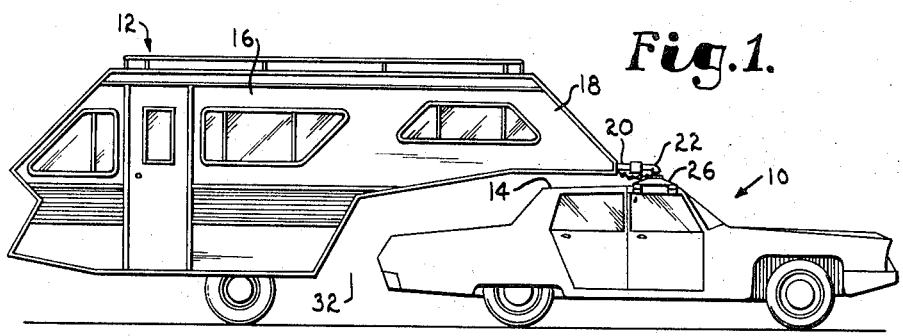
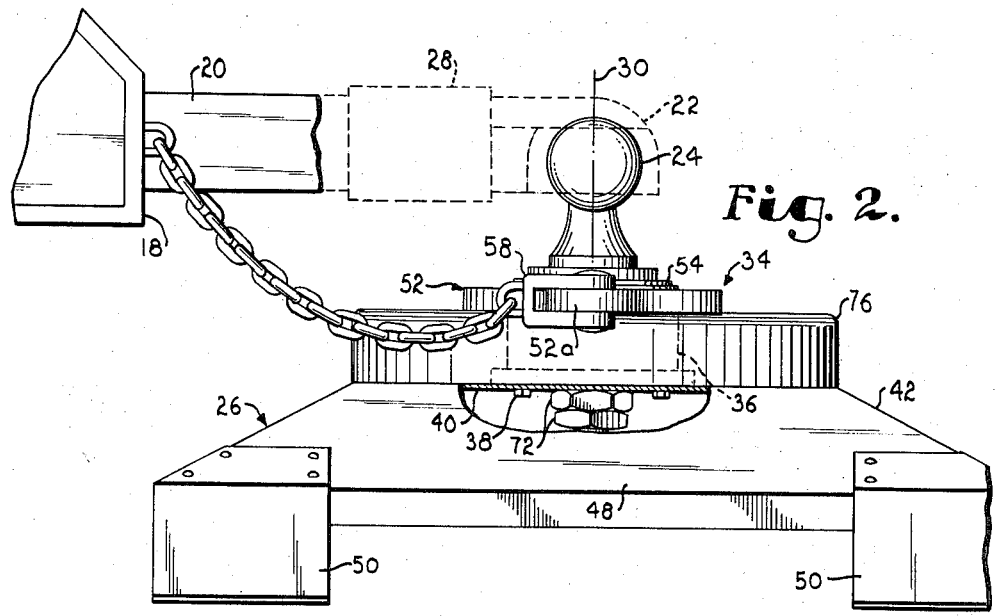
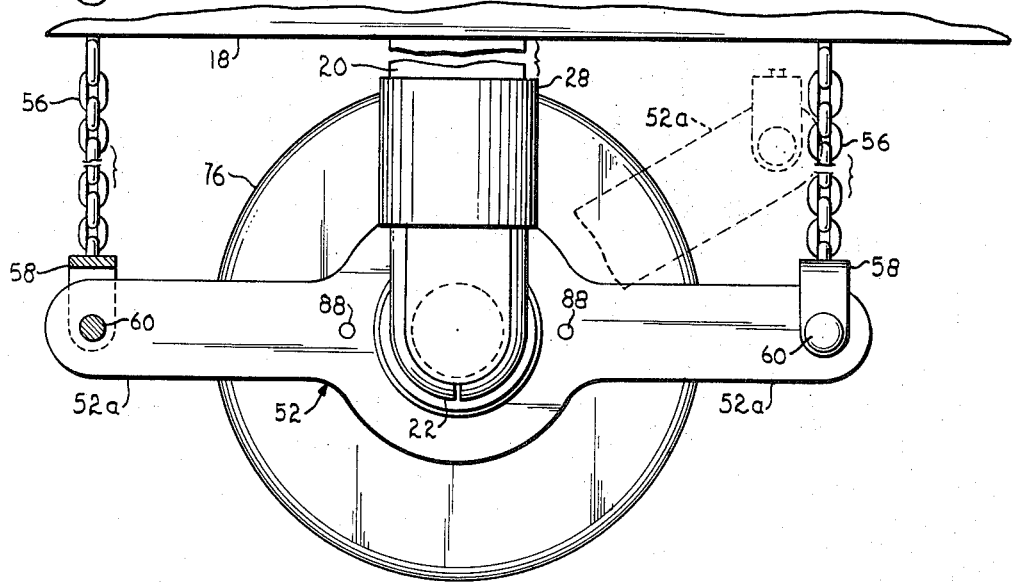

PATENTED AUG 6 1974 3,827,722

SAFETY CHAIN ATTACHMENT FOR ROOF-MOUNTED TRAILER HITCH

This invention relates to improvements in hitches for connecting a trailer to a towing vehicle and, in particular, to a hitch assembly which provides a safety coupling and yet also provides the capability for unlimited relative movement of the vehicle and the trailer about the axis of the hitch connection.

A number of states in this country require that safety chains be employed when coupling a trailer to a towing vehicle utilizing a hitch of the ball and socket type. The purpose of a safety chain or safety cable is, of course, to provide a secondary coupling in the event of failure of the primary coupling provided by the ball and socket hitch. Therefore, it is obviously necessary that the safety chain connection not depend on the integrity of the primary hitch coupling in any way. Also, besides the requirements of state laws, a safety coupling is advantageous as a safeguard with or without mandatory regulations for all types of hitches used in the interconnection of self-propelled vehicles and towed trailer units.

However, the safety chain can be a severe disadvantage in instances where the hitch provides for unlimited relative rotation of the towing vehicle and the trailer about the hitch axis. If the towing vehicle and the trailer are capable of relative rotation through at least 180° (90° or more in either direction from an aligned, normal position), then the presence of the usual safety chain creates a serious problem since the chain may begin to wrap around the hitch or become stressed if rotation continues. Accordingly, the advantage in mobility achieved by hitches of this type cannot be realized using safety chains connected in the usual manner.

Recently, roof-mounted hitches for automobiles have been introduced in the recreational vehicle market and are used in conjunction with specially designed trailers having a nose portion that extends above the towing vehicle to the hitch connection. This arrangement permits unlimited relative rotation of the towing and towed units about the vertical axis of the hitch connection, resulting in considerably enhanced maneuverability and handling characteristics. These hitches also eliminate jackknifing, but are not compatible with conventional safety chain arrangements for the reasons as discussed above. It may be appreciated that the problem of providing a suitable safety chain connection is particularly acute in hitches of this type where 360° mobility is one of the principal features of the hitch design.

It is, therefore, the primary object of the present invention to provide a hitch for interconnecting a towing vehicle and a trailer wherein the interconnected vehicle and trailer are capable of relative rotation through at least 180°, and in which means is provided for connecting a safety chain or the like to the vehicle in a manner which permits such relative rotation without interference.

As a corollary to the foregoing object, it is an important aim of this invention to provide a hitch as aforesaid for use in a towing and towed vehicular combination where the vehicular units are capable of unlimited relative rotation about the axis of the hitch connection, and wherein a rotatable connecting element forming a part of the hitch assembly is employed for the safety chain in order to provide a swivel connection that rotates with the trailer as the latter and the towing vehicle undergo relative rotation.

Another important object of this invention is to provide a hitch as aforesaid having a safety coupling device for one or more safety chains or the like, wherein such coupling device is secured to the towing vehicle independently of the component or components of the hitch that form the primary connection with the trailer, so that the integrity of the safety coupling is in no way adversely affected should a failure in the primary coupling occur.

Furthermore, it is an important object of the present invention to provide a hitch assembly for interconnecting towing and towed vehicles, wherein two independent rotatable couplings are employed having a common axis, such couplings presenting the primary hitch connection and a secondary, safety connection between the two vehicles.

Additionally, it is a specific and important object of this invention to provide a hitch assembly especially adapted for mounting on the roof of a towing vehicle in order to render the vehicle and a trailer connected thereto capable of unlimited relative rotation about the axis of the hitch, wherein a rotatable element carried by a fixed hub coaxial with the axis of the hitch serves as a swivel connection for one or more safety chains to prevent the latter from interfering with the free relative rotation of the interconnected vehicular units.

In the drawings:

FIG. 1 is a side elevational view of a towing vehicle and a trailer interconnected with a roof-mounted hitch assembly;

FIG. 2 is a side elevational view similar to FIG. 1 but on a greatly enlarged scale, omitting the towing vehicle and showing the trailer fragmentarily;

FIG. 3 is a top plan view of the hitch assembly shown in FIG. 2;

Figure 4:
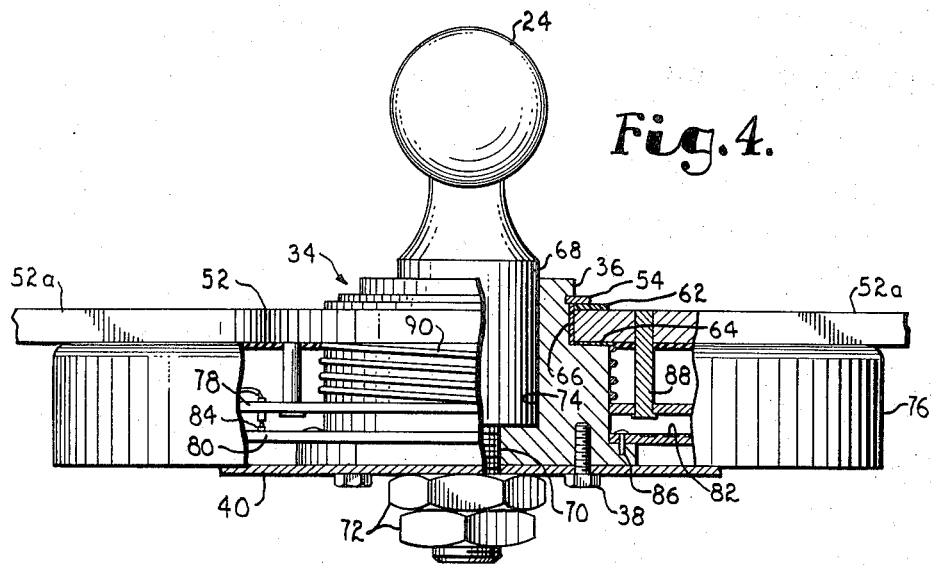
FIG. 4 is a front elevational view of the hitch assembly shown in FIG. 2.

Referring initially to FIG. 1, a conventional four-door sedan is illustrated at 10 and is shown towing a travel trailer 12 which is designed to accommodate a hitching arrangement mounted on the roof 14 of the towing vehicle 10. The trailer 12 has a primary, rear body section 16 and a secondary, front body section 18 which presents a forwardly projecting nose portion that extends above the roof 14 to the hitch. As is clear in FIG. 2, a tongue 20 at the forward end of the nose portion 18 is provided with a split socket 22 that fits over a hitch ball 24 mounted on a support platform broadly denoted 26. The split socket 22 is a conventional releasable hitch socket and is locked closed by a spring-loaded sleeve 28 to form a positive connection with the ball 24. The platform 26 overlies the roof 14 of the vehicle 10 and is located midway between the front and rear bumpers of the vehicle, thus the hitch ball 24 and mating socket 22 permit unlimited relative rotation of the two vehicular units about the vertical axis 30 established by the ball and socket connection. Note in this respect that a clearance cavity 32 is formed beneath the nose portion 18 in front of the rear section 16 of the trailer 12.

Interconnected vehicular units utilizing a hitch of the roof-mounted type are disclosed in the U.S. Pat. Application of Harry L. Taylor, Ser. No. 216,551, Filed Jan. 10, 1972, now U.S. Pat. No. 3,756,624. The principal feature of hitching arrangements of this type is the 360° mobility permitted by the roof-top location of the hitch and the clearance cavity 32 in the trailer design. This presumes, of course, that there is no safety coupling between the two units that would interfere with the unlimited mobility. This further presumes that electrical connections between the towing vehicle and the trailer are made in such a manner to also preclude interference with the capability for unlimited relative rotation of the two vehicular units. In this latter respect, reference may be made to the U.S. Pat. Application of Ernest E. Letterman, Ser. No. 230,860, Filed Mar. 1, 1972 for a disclosure of a printed circuit board connector also disclosed herein in FIGS. 4 and 5 as will be discussed hereinafter.

Referring particularly to FIGS. 2–5, it may be seen that the hitch assembly of the present invention includes a safety coupling device broadly denoted 34 in addition to the primary coupling provided by the hitch ball 24. The device 34 includes a fixed hub or base 36 of stepped, cylindrical configuration disposed in coaxial relationship with the vertical axis 30 defined by the hitch ball 24. Several fasteners in the form of cap screws 38 secure the bottom of the hub 36 directly to the elevated central portion 40 of the support platform 26, the latter being of a shallow, frusto-pyramidal configuration as is clear in FIGS. 2 and 5. The platform 26 is preferably of heavy metal construction such as boiler plate stock, and presents four downwardly sloping surfaces 42, 44, 46 and 48 radiating from the central portion 40. The platform 26 is of generally rectangular configuration as viewed in plan and extends across the roof 14, brackets 50 at the four corners of the platform 26 being employed to secure the platform to the vehicle roof. The brackets 50 are specially configured to hook over the gutter or edge molding of the roof 14 and extend into engagement with the body of the vehicle therebeneath, rows of rivnuts (not shown) being utilized to securely fasten the brackets 50 to the vehicle body.

A rotatable element 52 is retained on the hub 36 by a snap ring 54, and presents a pair of spaced, radially outwardly extending, horizontal arms 52a. A pair of safety chains 56 extend from the front of the nose portion 18 of the trailer 12 on opposite sides of the tongue 20, the forward ends of the chains 56 being connected by clevises 58 and pins 60 to the respective ends of the arms 52a. It may be noted in FIG. 4 that the center ring portion of the element 52 essentially rests on the annular surface presented by the middle part of the hub 36 which is of a diameter greater than the uppermost part but less than the base portion thereof. However, metal-to-metal contact is avoided by the use of a pair of washers 62 and 64 above and below the element 52, and a bushing 66 surrounding the hub 36. The washers 62 and 64 and the bushing 66 may be of nylon or other suitable nonmetallic material.

The hitch ball 24 is integral with a stem 68 that terminates in a threaded shank 70 of reduced diameter, the shank 70 extending through a centrally disposed aperture in the center portion 40 of the platform 26 and being held by a pair of nuts 72. Alternatively, a single nut and lock washer arrangement may be used. It should be noted that the hub 36 is centrally bored to provide an opening 74 coaxial with the axis 30 of the ball 24 and receiving the stem 68 and shank 70. However, through the use of the fasteners 38, the hub 36 is secured to the platform 26 entirely independently of the hitch ball 24, thus the latter may be completely released from the platform (such as by unthreading the nuts 72) without in any way affecting the integrity of the hub mounting, the element 52 being held by the snap ring 54 seated in groove 55 (FIG. 5).

Figure 5:
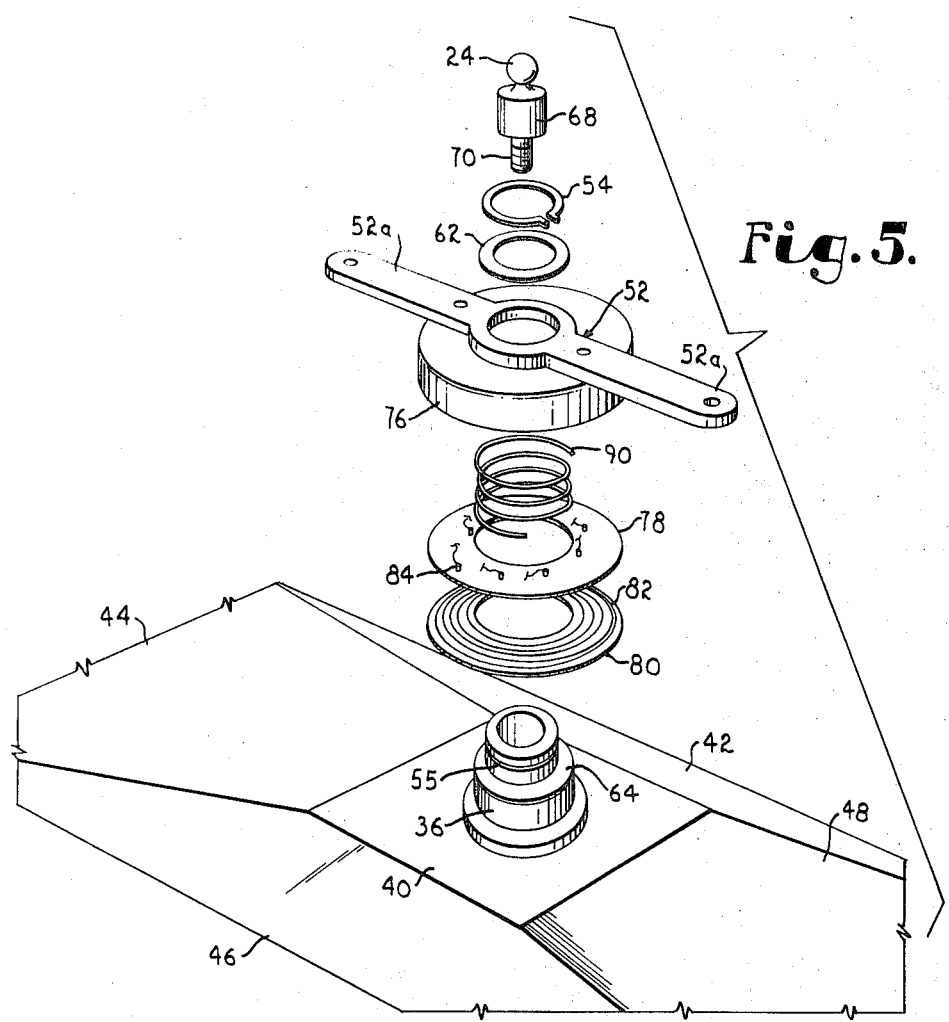
FIG. 5 is an exploded view of the hitch assembly.

The arms 52a carry a circular dust cover 76 having a circumferential skirt that enshrouds an electrical contact assembly seen in FIGS. 4 and 5. Details of construction of the contact assembly are contained in the aforesaid Letterman patent application, the primary components thereof being a pair of horizontal, vertically spaced plate members 78 and 80. The lower plate member 80 comprises a printed circuit board having a number of concentric, electrically conductive lands 82 on its upper surface. The upper plate member 78 is a second disc-shaped insulating board which supports a number of wipers 84 that project downwardly therefrom into engagement with corresponding lands 82. The upper ends of the wipers 84 present a set of terminals to which a multi-conductor cable (not shown) is connected, such cable extending to the electrical circuits of the trailer 12. The lands 82 on the printed circuit board also present a set of terminals (not shown) to which another multi-conductor cable is connected, this cable in turn being connected to electrical power and control circuits in the towing vehicle 10. The printed circuit board 80 rests on the annular surface provided by the large base portion of the hub 36, and is fixed thereto by a number of press pins 86. The upper plate member 78 is rotatable on the hub 36 with arms 52a, dowel pins 88 being employed to interconnect the arms 52a and the plate member 78 as may be seen in FIG. 4. Contact pressure between the wipers 84 and the lands 82 is maintained by a coil spring 90 sandwiched between the upper plate member 78 and the central ring portion of the rotatable element 52.

In use, it may be appreciated that the rotatable element 52 provides a swivel connection for the safety chains 56 so that relative movement of the towing vehicle 10 and the trailer 12 about the axis 30 is unimpeded. This is illustrated by the broken lines in FIG. 3, one of the arms 52a being shown angularly displaced as might occur, for example, during a normal turning maneuver.

Furthermore, as has been pointed out hereinabove, complete failure of the primary hitch coupling (ball 24 and socket 22) in no way affects the integrity of the safety coupling system. The swivel connection for the chains 56 remains intact even in the event of loss of the nuts 72 and complete removal of the hitch ball 24 from its mounting. Additionally, the use of two safety chains 56 (or cables may be substituted) on opposite sides of the tongue 20 provides for smooth operation of the swivel connection via the diametrically opposed arms 52a that provide coupling points on opposite sides of the axis 30. The swivel connection also does not interfere with the use of the electrical contact assembly, as the upper plate member 78 carrying the wipers 84 rotates in unison with the swivel element 52.

We claim:

1. In combination:

a towing vehicle having a roof;

a trailer having a forwardly projecting portion extending above the roof of said vehicle;

support structure on said roof;

hitch means having a hitch component mounted on said structure, and a mating hitch part connected with said component and carried by said portion of the trailer, said hitch component establishing an upright axis about which said vehicle and said trailer are capable of unlimited relative rotation;

a safety coupling member extending from said portion of the trailer;

a safety coupling device on said structure adjacent said hitch component;

means securing said device to said structure independently of said hitch component, said device including a rotatable element provided with means spaced from said axis for connecting the element with said safety coupling member, and a hub rigid with said structure and mounting said element for rotation on the hub about said axis with the trailer as the latter and said vehicle undergo relative rotation, said hub having an opening therethrough coaxial with said axis and said hitch means comprising a ball and socket hitch, said hitch component being disposed above said hub and provided with a shank received within said opening and extending axially downwardly through said hub; and means on said shank securing the same to said structure.

2. In combination:

a towing vehicle having a roof;

a trailer having a forwardly projecting portion extending above the roof of said vehicle;

support structure on said roof;

hitch means having a hitch component mounted on said structure, and mating hitch part connected with said component and carried by said portion of the trailer, said hitch component establishing an upright axis about which said vehicle and said trailer are capable of unlimited relative rotation;

a safety coupling member extending from said portion of the trailer;

a safety coupling device on said structure adjacent said hitch component;

means securing said device to said structure independently of said hitch component, said device including a rotatable element provided with means spaced from said axis for connecting the element with said safety coupling member, and a hub rigid with said structure and mounting said element for rotation on the hub about said axis with the trailer as the latter and said vehicle undergo relative rotation, said hitch component being disposed above said hub;

a pair of upper and lower, relatively rotatable, vertically spaced plate members on said hub, said plate members being provided with sets of terminals for connection with a pair of multi-conductor electrical cables extending to said vehicle and said trailer respectively; and electrical contact means maintaining electrical continuity between corresponding terminals of the respective plate members irrespective of their relative angular positions, one of said plate members being fixed on said hub and the other plate member being rotatable thereon, said element having means engaging said other plate member to cause the latter and the element to rotate together about said axis.

3. In combination:

a towing vehicle having a roof;

a trailer having a forwardly projecting portion extending above the roof of said vehicle;

support structure on said roof;

hitch means having a hitch component mounted on said structure, and a mating hitch part connected with said component and carried by said portion of the trailer, said hitch component establishing an upright axis about which said vehicle and said trailer are capable of unlimited relative rotation;

a safety coupling member extending from said portion of the trailer;

a safety coupling device on said structure adjacent said hitch component;

means securing said device to said structure independently of said hitch component, said device including a rotatable element provided with means spaced from said axis for connecting the element with said safety coupling member, and a hub rigid with said structure and mounting said element for rotation on the hub about said axis with the trailer as the latter and said vehicle undergo relative rotation, said hub having an opening therethrough coaxial with said axis, said hitch component being disposed above said hub and provided with a shank received within said opening and extending axially downwardly through said hub; and means securing said shank to said structure.

4. A hitch assembly for connecting a trailer and at least one safety coupling member extending from the trailer, such as a safety chain or the like, to a towing vehicle, said assembly comprising:

support structure adapted to be attached to said vehicle;

a hitch component mounted on said structure and adapted to be connected with a mating hitch part carried by said trailer, said hitch component establishing an upright axis about which said vehicle and said trailer are capable of relative rotation through at least 180° when said hitch part is connected with said hitch component;

a safety coupling device on said structure adjacent said hitch component;

means securing said device to said structure independently of said hitch component, said device including a rotatable element provided with means spaced from said axis for connecting the element with said safety coupling member, and a hub rigid with said structure and mounting said element for rotation on the hub about said axis with the trailer as the latter and said vehicle undergo relative rotation, said hub having an opening therethrough coaxial with said axis, said hitch component being vertically spaced from said hub and provided with a shank projecting from the component, received within said opening, and extending axially through said hub; and means securing said shank to said structure.

* * * * *